(12) United States Patent
Lin et al.

(10) Patent No.: US 7,487,692 B2
(45) Date of Patent: Feb. 10, 2009

(54) GUIDING DEVICE FOR BALL NUT

(75) Inventors: Chung Hsueh Lin, Taichung (TW); Yan Yu Chen, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 421 days.

(21) Appl. No.: 11/403,766

(22) Filed: Apr. 13, 2006

(65) Prior Publication Data

US 2007/0295132 A1 Dec. 27, 2007

(51) Int. Cl.
F16H 1/24 (2006.01)
(52) U.S. Cl. ................. 74/424.86; 74/424.81
(58) Field of Classification Search .............. 74/89.23, 74/89.34, 424.81, 424.82, 424.86, 424.87
See application file for complete search history.

(56) References Cited

U.S. PATENT DOCUMENTS

| | | | | |
|---|---|---|---|---|
| 2,833,156 A | * | 5/1958 | Spontelli | 74/424.84 |
| 3,261,224 A | * | 7/1966 | Anthony | 74/424.86 |
| 3,371,551 A | * | 3/1968 | Profet | 74/424.86 |
| 3,971,264 A | | 7/1976 | Detraz et al. | 74/459 |
| 5,014,568 A | | 5/1991 | Schlenker | 74/424.8 R |
| 5,063,809 A | | 11/1991 | Schlenker | 74/459 |
| 5,388,475 A | * | 2/1995 | Shear et al. | 74/424.86 |
| 5,711,188 A | * | 1/1998 | Miyaguchi et al. | 74/424.87 |
| 5,791,192 A | * | 8/1998 | Lee | 74/424.87 |
| 5,988,007 A | * | 11/1999 | Nishimura | 74/424.87 |
| 6,813,969 B2 | * | 11/2004 | Huang | 74/424.83 |
| 6,813,970 B2 | * | 11/2004 | Siler et al. | 74/424.87 |
| 7,350,434 B2 | * | 4/2008 | Nishimura et al. | 74/424.86 |

* cited by examiner

Primary Examiner—Richard W L Ridley
Assistant Examiner—Matthew Johnson
(74) Attorney, Agent, or Firm—Charles E. Baxley (57) ABSTRACT

A ball nut includes a nut member having an inner thread formed in a bore for threading with a screw member, the nut member includes a recess and an opening communicating with the bore of the nut member for forming one or more anchoring surfaces. A guiding device includes a shank received in the recess of the nut member, and one or more return channels formed in the shank for aligning with the inner thread of the nut member, and an anchoring bar on one end of the shank and engaged in the opening of the nut member. The anchoring bar has one or more end portions for engaging with the anchoring surface of the nut member and for securing the guiding device to the nut member.

5 Claims, 7 Drawing Sheets

GUIDING DEVICE FOR BALL NUT

BACKGROUND OF THE INVENTION

1. Field of the Invention

The present invention relates to a ball nut, and more particularly to a ball nut having a guiding or positioning device engaged into a nut member and having return channels for aligning with the threads of the nut member and for forming endless passages to receive rollers or balls.

2. Description of the Prior Art

Typical screw shafts comprise a screw member threaded into a nut member, or relatively, a nut member threaded onto a screw member, and a number of rollers or balls engaged in the threads of the nut member and the screw member for facilitating the rotational or sliding movement between the nut member and the screw member.

For allowing the rollers or balls to be cyclically and smoothly engaged in or moved along the threads of the nut member and the screw member, one or more tubular members, return tube arrangements, deflectors or the like are engaged into or onto the nut member and each include an inner channel for aligning with the threads of the nut member and for forming endless passages to receive the rollers or balls.

For example, U.S. Pat. No. 3,971,264 to Detraz et al., U.S. Pat. No. 5,014,568 to Schlenker, and U.S. Pat. No. 5,063,809 to Schlenker disclose three of the typical ball nuts each also comprising one or more tubular members, return tube arrangements, deflectors attached to the nut member for forming the endless guide passages and for receiving the rollers or balls.

Normally, the nut member is required to be drilled with two or more holes for aligning with the threads of the nut member and for engaging with the tubular members, the return tube arrangements, the deflectors or the like and for cyclically receiving the rollers or balls.

However, it will be difficult to drill holes in the middle portion of the nut member due to the rounded outer peripheral surface of the nut member, and it will be much more difficult to drill and align the holes with the threads of the nut member because the threads of the nut member may not be seen while drilling or machining the holes in the nut member.

The present invention has arisen to mitigate and/or obviate the afore-described disadvantages of the conventional guiding members for the ball nuts.

SUMMARY OF THE INVENTION

The primary objective of the present invention is to provide a ball nut including a guiding or positioning device engaged into a nut member and having return channels for aligning with the threads of the nut member and for forming endless passages to receive rollers or balls.

The other objective of the present invention is to provide a ball nut including a nut member that may be easily machined with one or more spaces for receiving and anchoring and positioning the guiding or positioning device.

In accordance with one aspect of the invention, there is provided a ball nut comprising a nut member including a bore formed therein, and an inner thread formed in the bore of the nut member for threading with a screw member, the nut member including a recess formed therein and communicating with the bore of the nut member, and including an opening formed in a first end of the nut member and communicating with the bore and the recess of the nut member, the opening of the nut member including a width greater than that of the recess of the nut member for forming at least one anchoring surface between the opening and the recess of the nut member and formed in the first end of the nut member, a guiding device including a shank received and engaged in the recess of the nut member, and including at least one return channel formed in the shank for aligning with the inner thread of the nut member, and including an anchoring bar provided on the shank and engaged in the opening of the nut member, and the anchoring bar including at least one end portion extended out of the shank of the guiding device for engaging with the anchoring surface of the nut member and for anchoring the guiding device to the nut member and for preventing the guiding device from moving relative to the nut member, and a securing device for securing the guiding device to the nut member. The bore and the recess and the opening may be easily machined or formed in the nut member.

The guiding device includes at least one tongue extended from the anchoring bar for engaging with at least one corresponding cavity formed in the shank and for securing the anchoring bar and the shank together.

The guiding device includes a second anchoring bar provided on the shank for engaging with the nut member. The guiding device includes at least one tongue extended from the second anchoring bar for engaging with at least one corresponding cavity formed in the shank and for securing the second anchoring bar and the shank together.

The securing device includes at least one fastener engaged with the guiding device and the nut member for securing the guiding device to the nut member. The fastener is engaged through the end portion of the anchoring bar and threaded with a screw hole formed in the anchoring surface of the nut member.

Alternatively, the fastener may be engaged through the nut member and threaded with a screw hole formed in the shank of the anchoring bar. Further alternatively, the securing device includes a retaining ring attached to the nut member and engaged with the guiding device for securing the guiding device to the nut member. The nut member includes a peripheral slot for receiving the retaining ring.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
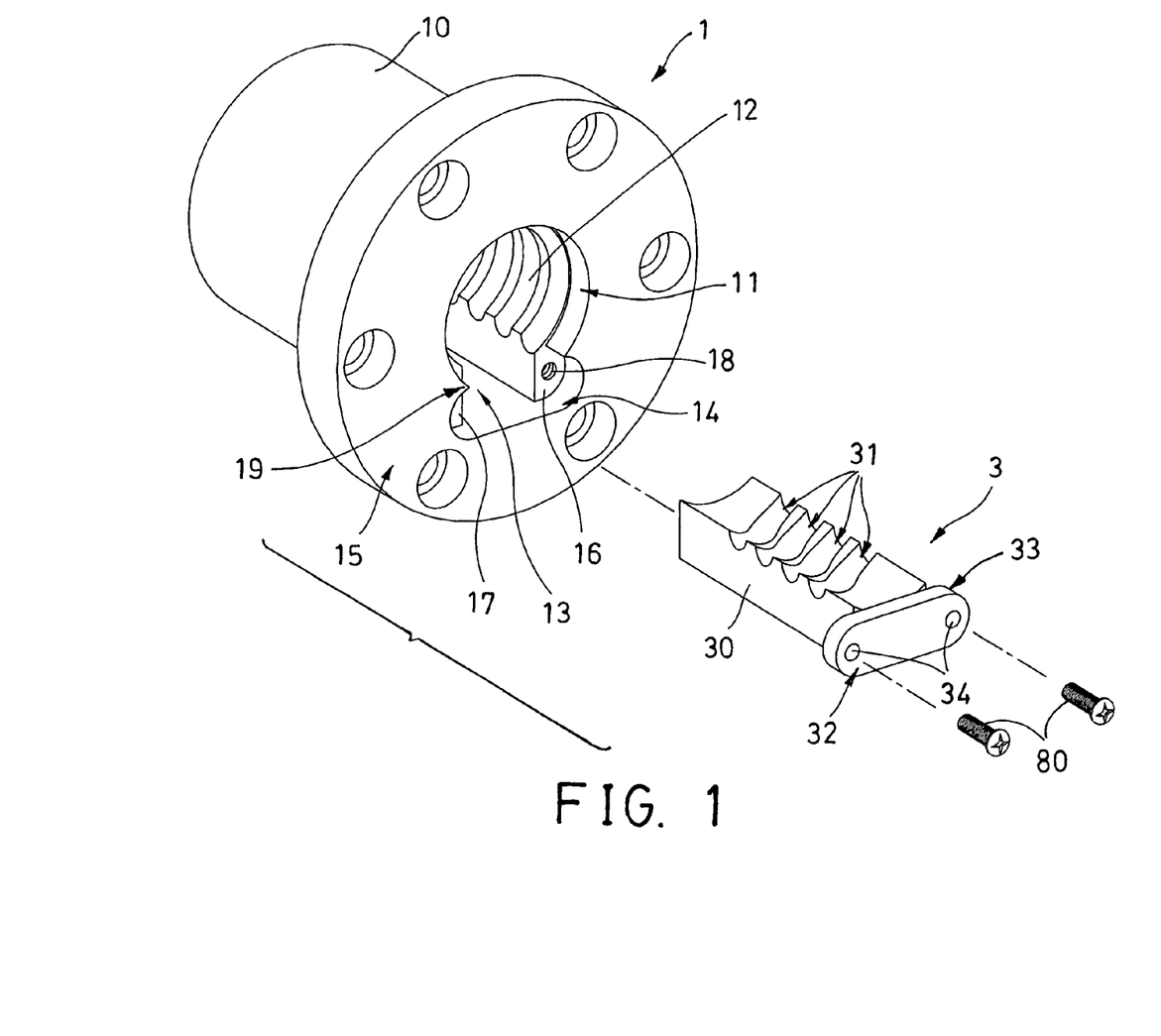
FIG. 1 is a partial exploded view illustrating a nut number of a ball nut in accordance with the present invention.
Figure 2:
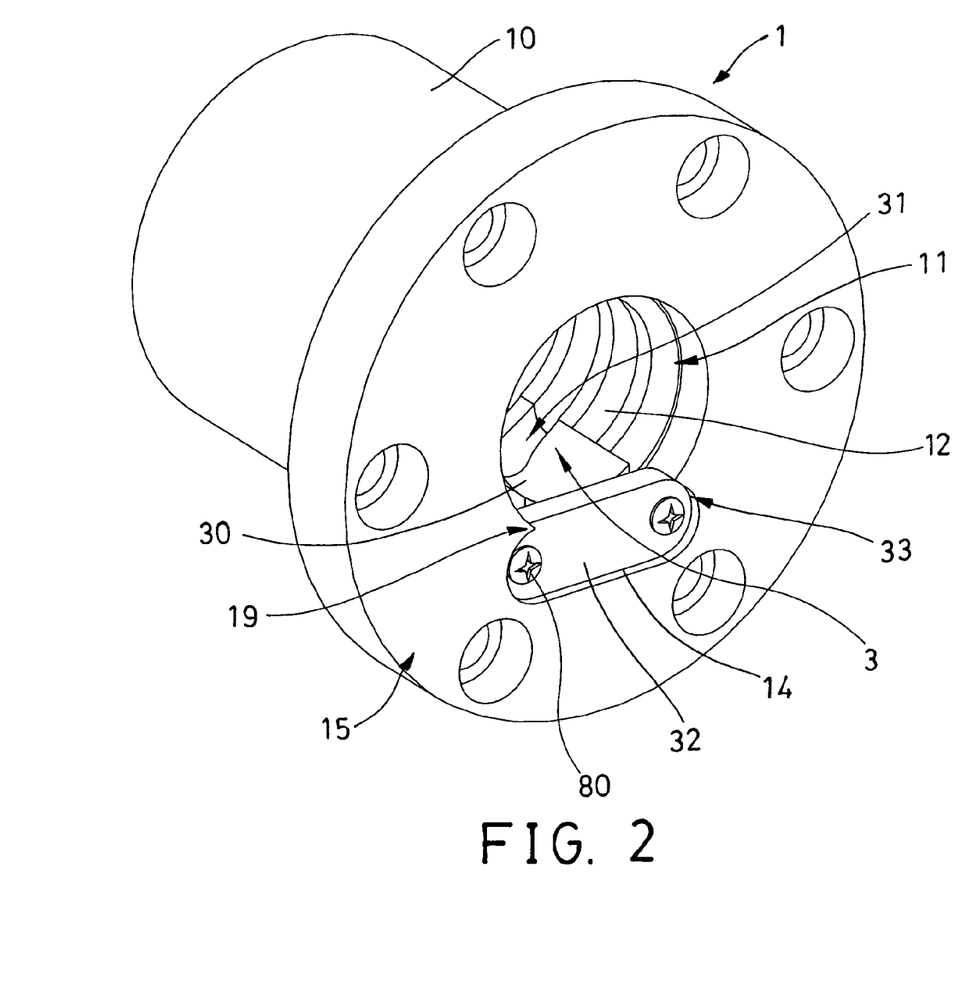
FIG. 2 is a perspective view of the nut number of the ball nut.
Figure 3:
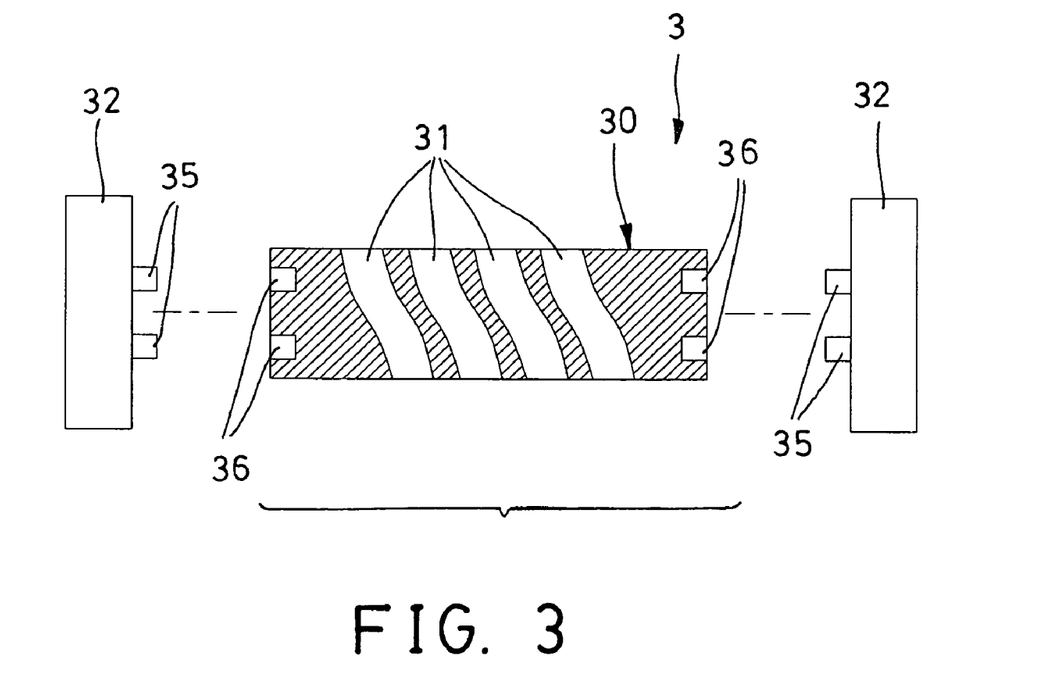
FIG. 3 is an exploded and partial cross sectional view illustrating a guiding or positioning device for attaching to the nut number of the ball nut.

Referring to the drawings, and initially to FIGS. 1-3, a ball nut 1 in accordance with the present invention comprises a nut member 10 including a longitudinal bore 11 formed therein and an inner thread 12 formed in the longitudinal bore 11 thereof for threading with a typical screw member (not shown). The threading engagement of the nut member 10 with the screw member is typical and has been disclosed in the cited U.S. Pat. No. 3,971,264 to Detraz et al., U.S. Pat. No. 5,014,568 to Schlenker, and U.S. Pat. No. 5,063,809 which may be taken as references for the present invention.

The nut member 10 includes a longitudinal recess 13 formed therein and aligning and communicating with the bore 11 thereof for receiving a shank 30 of a guiding or positioning device 3, and includes an opening 14 formed in one or first end 15 of the nut member 10 and communicating with the bore 11 and the recess 13 of the nut member 10, in which the opening 14 of the nut member 10 includes a length or width greater than that of the recess 13 of the nut member 10 for forming one or more shoulders or anchoring surfaces 16, 17 formed between the opening 14 and the recess 13 of the nut member 10 or formed in the one or first end 15 of the nut member 10.

The nut member 10 further includes one or more attaching or securing means or devices 18, such as inner threads or screw holes 18 formed in each of the shoulders or anchoring surfaces 16, 17 of the nut member 10 for engaging or threading with fasteners 80 which may be used for securing the guiding or positioning device 3 and for preventing the guiding or positioning device 3 from moving or shifting relative to the nut member 10. The guiding or positioning device 3 includes one or more return channels 31 formed in the shank 30 for aligning with the inner thread 12 of the nut member 10 and for forming one or more endless passages (12, 31) to receive rollers or balls (not shown).

The guiding or positioning device 3 includes an anchoring bar 32 secured or provided on one end of the shank 30 and engaged in the opening 14 of the nut member 10, and the anchoring bar 32 includes one or both end portions 33 laterally extended out of the shank 30 of the guiding or positioning device 3 for engaging with the shoulders or anchoring surfaces 16, 17 of the nut member 10, and for preventing the guiding or positioning device 3 from moving or shifting longitudinally and laterally relative to the nut member 10. The guiding or positioning device 3 further includes one or more orifices 34 formed in the anchoring bar 32 and offset from the shank 30 for aligning with the securing means or devices 18 of the nut member 10 and for receiving the fasteners 80 and for allowing the fasteners 80 to secure the guiding or positioning device 3 to the nut member 10.

The nut member 10 may further include one or more positioning projections 19 extended between the bore 11 and the opening 14 of the nut member 10 for engaging with the anchoring bar 32 of the guiding or positioning device 3 and for further anchoring or positioning the guiding or positioning device 3 to the nut member 10 and for preventing the guiding or positioning device 3 from moving or shifting up and down relative to the nut member 10. The guiding or positioning device 3 may thus be solidly and stably secured to the nut member 10 with the securing means or devices 18 of the nut member 10 and/or the fasteners 80. The anchoring bar 32 of the guiding or positioning device 3 may be selectively and solidly secured together or formed integral with each other.

Figure 4:
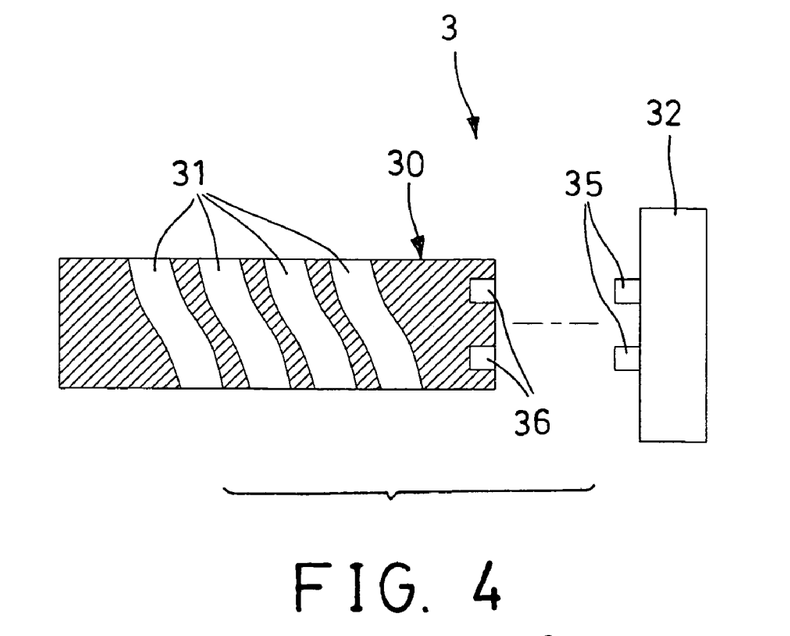
FIG. 4 is an exploded and partial cross sectional view similar to FIG. 3, illustrating the other arrangement of the guiding or positioning device of the ball nut.

As shown in FIG. 3, the anchoring bar 32 of the guiding or positioning device 3 may include one or more latches or tongues 35 extended therefrom for engaging with one or more corresponding cavities 36 of the shank 30 with such as force-fitted engagements, and for securing the anchoring bar 32 and the shank 30 together, and for allowing the anchoring bar 32 and the shank 30 to be made separately. The guiding or positioning device 3 may include two anchoring bars 32 secured or provided on the two ends of the shank 30 for engaging with both ends of the nut member 10 and for further solidly anchoring or positioning the guiding or positioning device 3 to the nut member 10. However, as shown in FIG. 4, one single anchoring bar 32 is good enough for anchoring or positioning the guiding or positioning device 3 to the nut member 10.

Figure 5:
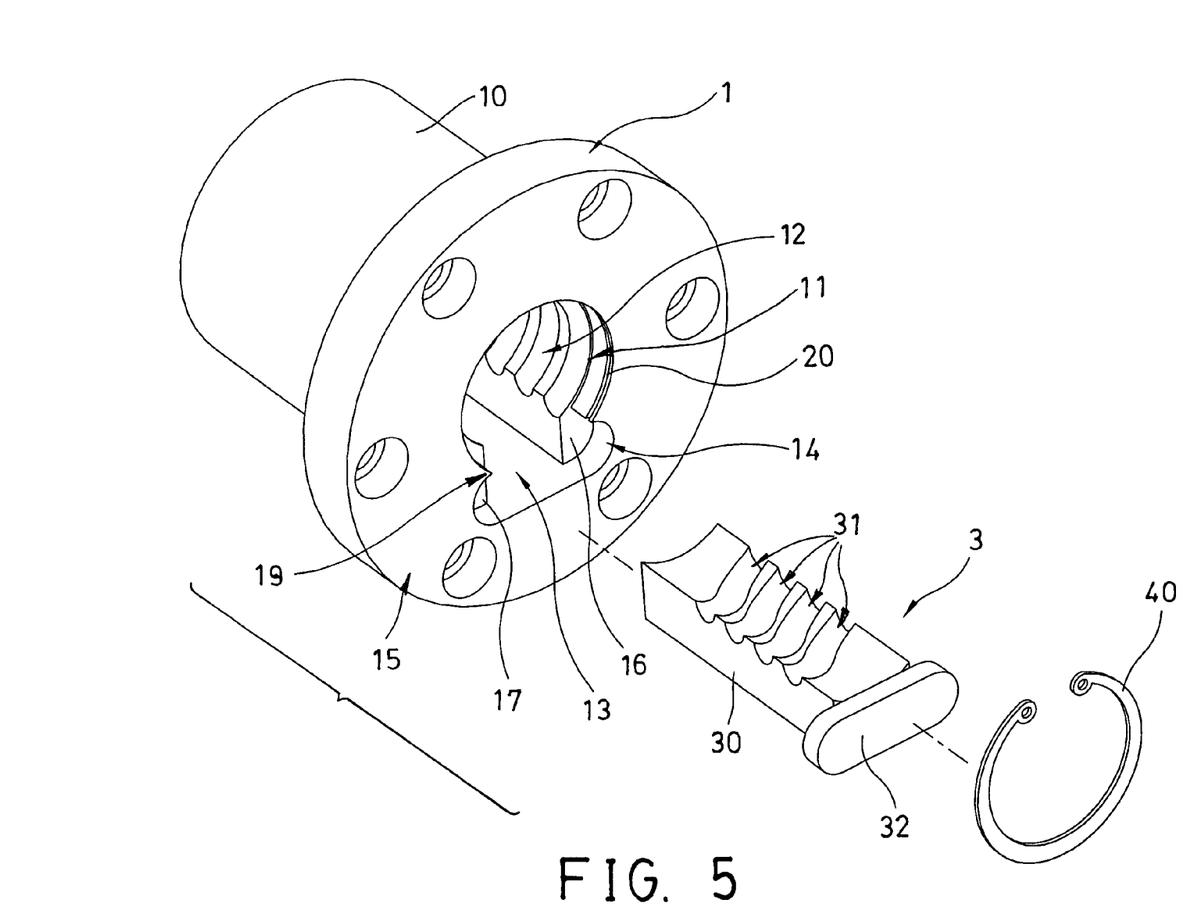
FIG. 5 is a partial exploded view similar to FIG. 1, illustrating the other arrangement of the ball nut.
Figure 6:
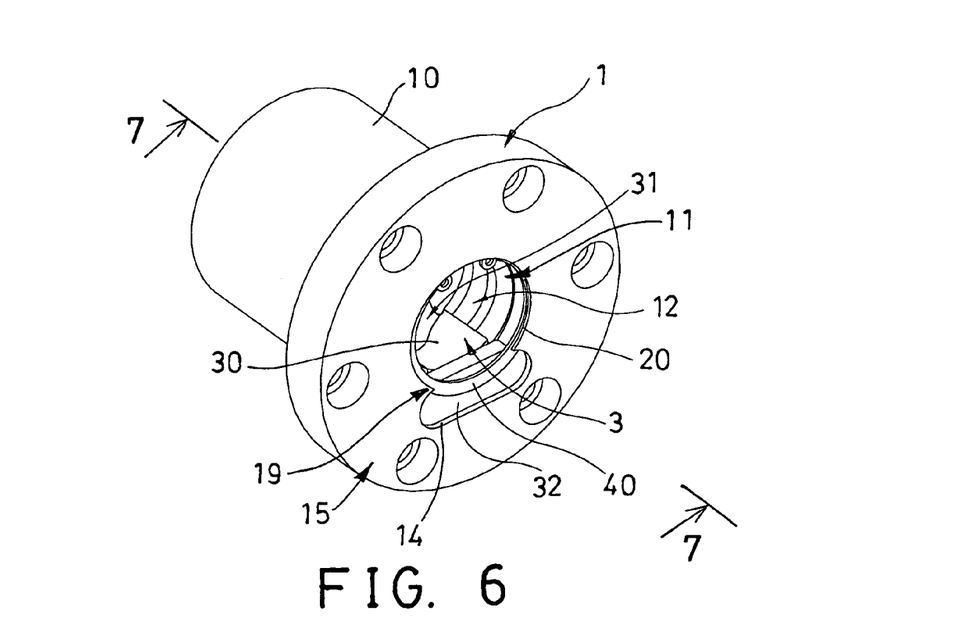
FIG. 6 is a perspective view of the ball nut as shown in FIG. 5.
Figure 7:
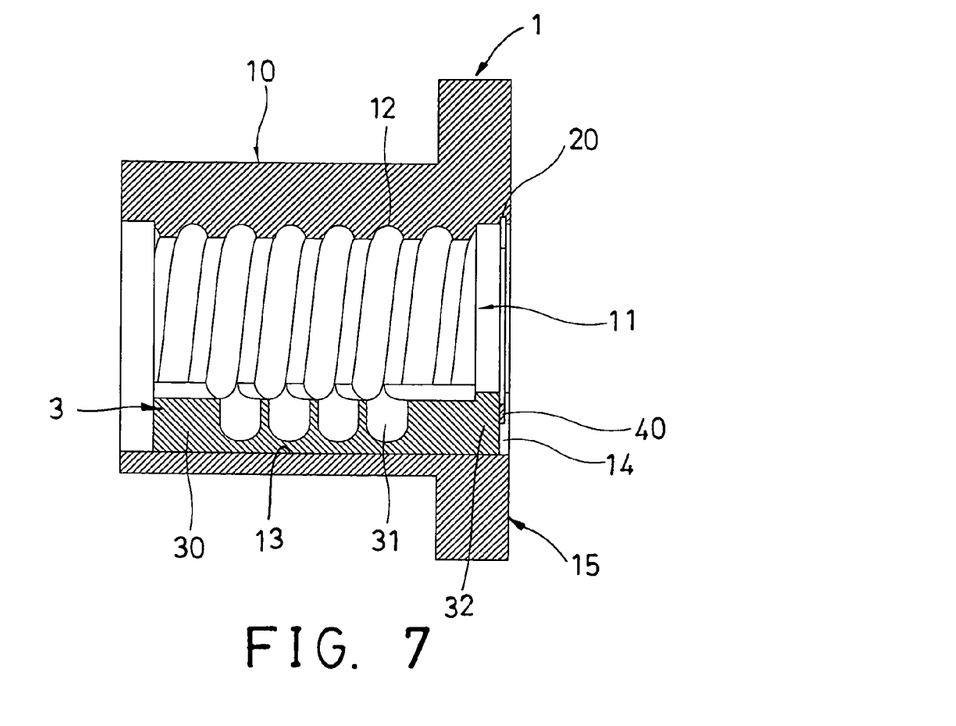
FIG. 7 is a cross sectional view taken along lines 7-7 of FIG. 6.

Referring next to FIGS. 5-7, alternatively, without the securing means or devices 18 of the nut member 10 and the fasteners 80, the guiding or positioning device 3 may be anchored or positioned or secured to the nut member 10 with the other anchoring or securing means or devices. For example, the nut member 10 may include a peripheral slot 20 formed in the one or first end 15 of the nut member 10 for receiving a retaining or clamping ring 40 which may be engaged with the anchoring bar 32 of the guiding or positioning device 3 for anchoring or positioning the guiding or positioning device 3 to the nut member 10.

Figure 8:
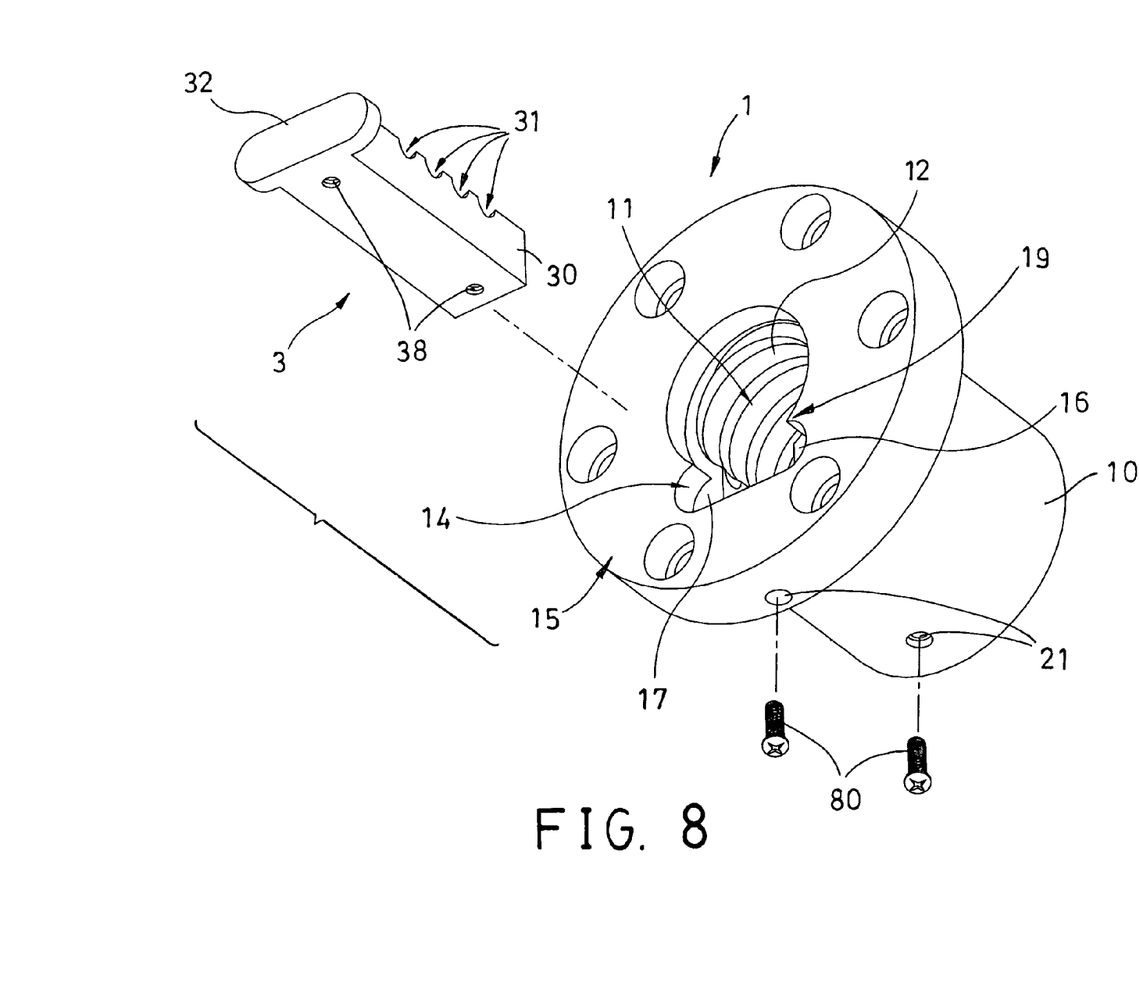
FIG. 8 is a partial exploded view similar to FIGS. 1 and 5, illustrating the further arrangement of the ball nut.
Figure 9:
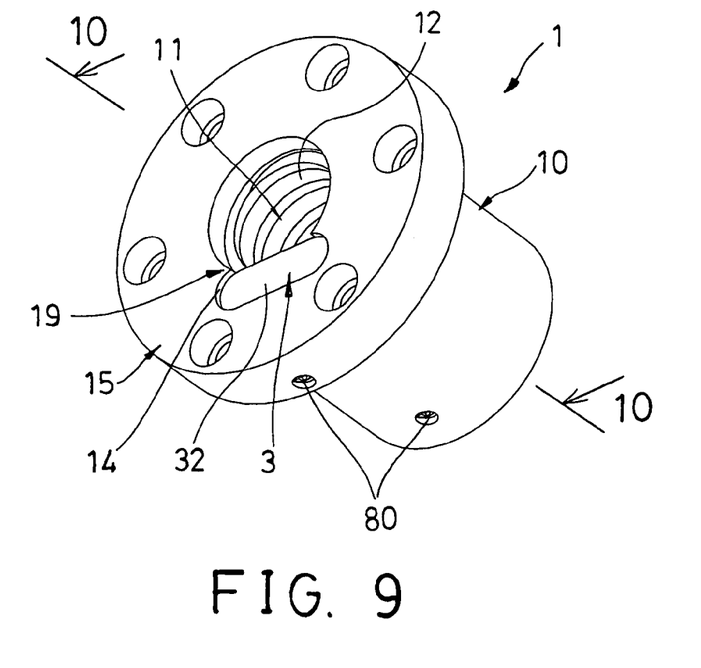
FIG. 9 is a perspective view of the ball nut as shown in FIG. 8.
Figure 10:
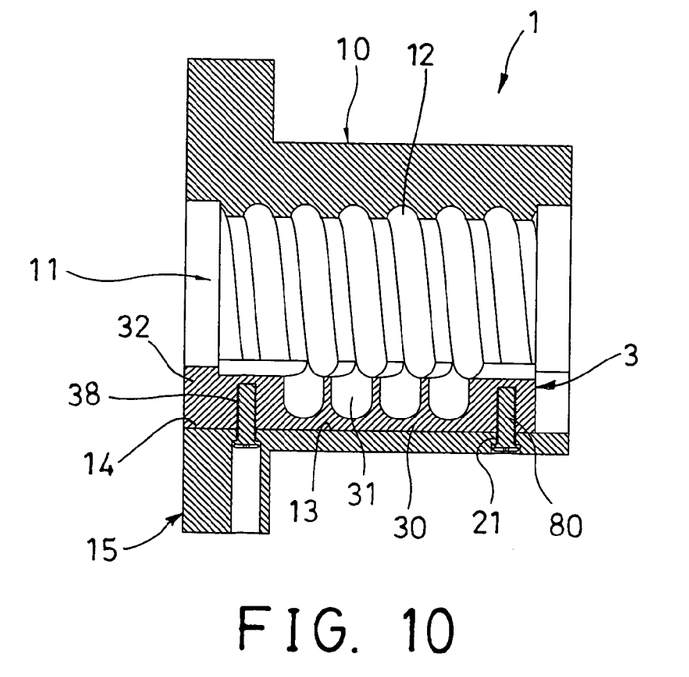
FIG. 10 is a cross sectional view taken along lines 10-10 of FIG. 9.

Referring next to FIGS. 8-10, further alternatively, the guiding or positioning device 3 may include one or more attaching or securing means or devices 38, such as inner threads or screw holes 38 formed in the shank 30, and the nut member 10 may include one or more apertures 21 formed therein for aligning with the securing means or devices 38 of the shank 30 and for receiving the fasteners 80 and for allowing the fasteners 80 to secure the guiding or positioning device 3 to the nut member 10.

It is to be noted that the bore 11 and the recess 13 and the opening 14 are opened to the end portions 15 of the nut member 10 or may be seen from outside of the nut member 10, and may thus be easily machined or formed in the nut member 10 for allowing the nut member 10 to be easily manufactured by the operators. The end portions 33 of the anchoring bars 32 may be engaged with the shoulders or anchoring surfaces 16, 17 of the nut member 10 for preventing the guiding or positioning device 3 from moving or shifting longitudinally and laterally relative to the nut member 10. In addition, the positioning projections 19 of the nut member 10 may further be provided for engaging with the anchoring bar 32 of the guiding or positioning device 3 and for further anchoring or positioning or securing the guiding or positioning device 3 to the nut member 10 and for preventing the guiding or positioning device 3 from moving or shifting up and down relative to the nut member 10.

Accordingly, the ball nut in accordance with the present invention includes a guiding or positioning device engaged into a nut member and having return channels for aligning with the threads of the nut member and for forming endless passages to receive rollers or balls, and the nut member may be easily machined with one or more spaces for receiving and anchoring and positioning the guiding or positioning device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A ball nut comprising:

a nut member including a bore formed therein, and an inner thread formed in said bore of said nut member for threading with a screw member, said nut member including a recess formed therein and communicating with said bore of said nut member, and including an opening formed in a first planar end surface of said nut member and communicating with said bore and said recess of said nut member, said opening of said nut member including a width greater than that of said recess of said nut member for forming at least one anchoring surface between said opening and said recess of said nut member and formed in said first end of said nut member, said nut member including at least one positioning projection extended between said bore and said opening of said nut member, a guiding device including a shank received and engaged in said recess of said nut member, and including at least one return channel formed in said shank for aligning with said inner thread of said nut member, and including a first anchoring bar provided on said shank and engaged in said opening of said nut member, and said first anchoring bar including at least one end portion extended out of said shank of said guiding device for engaging with said at least one anchoring surface of said nut member and for anchoring said guiding device to said nut member and for preventing said guiding device from moving relative to said nut member, and said at least one positioning projection of said nut member being engaged with said first anchoring bar of said guiding device for further anchoring said guiding device to said nut member, and said guiding device including at least one tongue extended from said anchoring bar for engaging with at least one corresponding cavity formed in said shank and for securing said anchoring bar and said shank together, and at least one fastener engaged through said at least one end portion of said anchoring bar and threaded with a screw hole formed in said at least one anchoring surface of said nut member for securing said guiding device to said nut member.

2. The ball nut as claimed in claim 1, wherein said guiding device includes a second anchoring bar provided on said shank for engaging with said nut member.

3. The ball nut as claimed in claim 2, wherein said guiding device includes at least one tongue extended from said second anchoring bar for engaging with at least one corresponding cavity formed in said shank and for securing said second anchoring bar and said shank together.

4. The ball nut as claimed in claim 1, wherein a retaining ring is attached to said nut member and engaged with said guiding device for securing said guiding device to said nut member.

5. The ball nut as claimed in claim 4, wherein said nut member includes a peripheral slot for receiving said retaining ring.

* * * * *